Patented Sept. 21, 1954

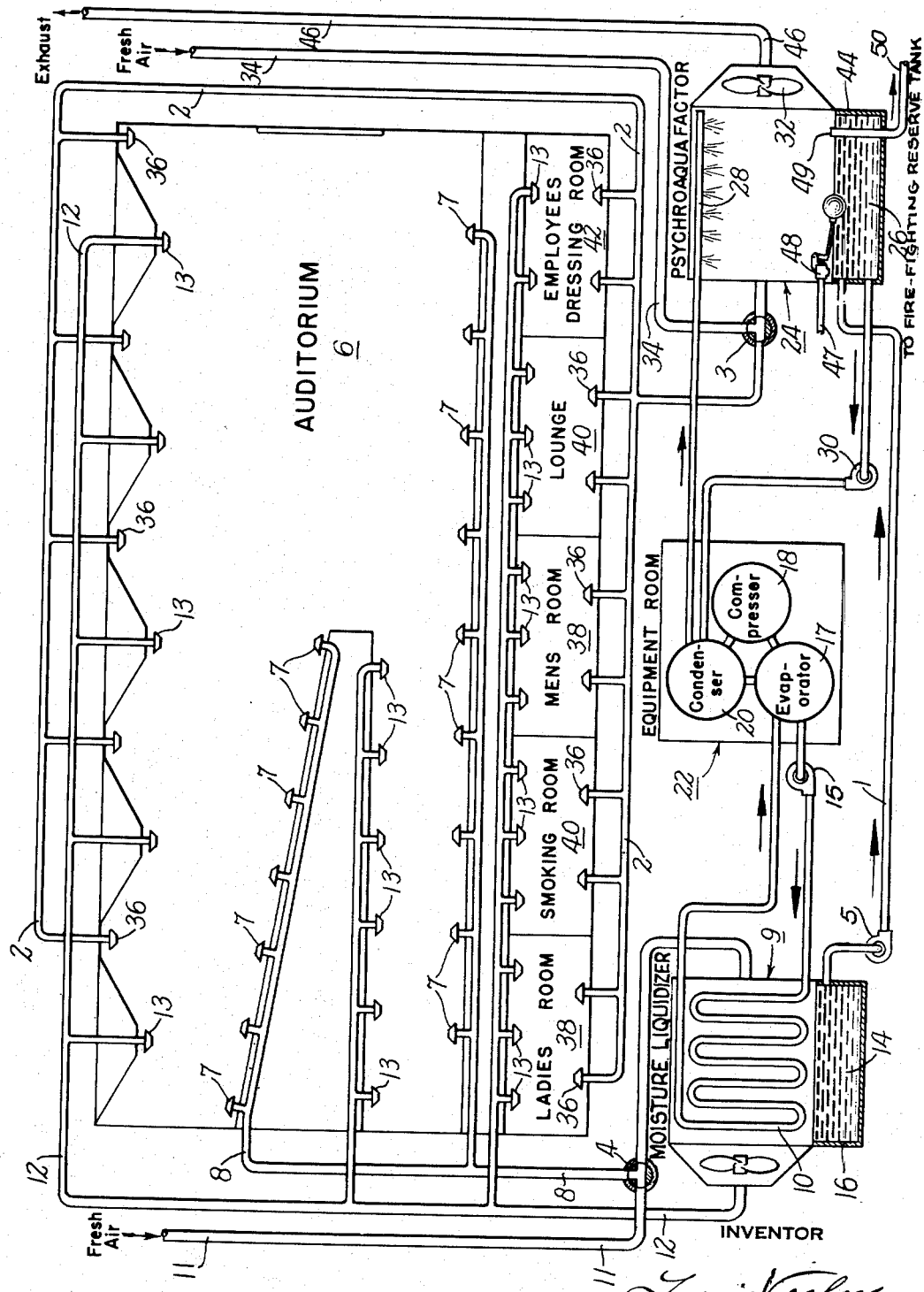

2,689,467

UNITED STATES PATENT OFFICE 2,689,467

UTILIZATION OF MOISTURE FROM AIR FOR INDIRECT AIR CONDITIONING

Ludwig Verber, New York, N. Y.

Application April 13, 1951, Serial No. 220,821

2 Claims. (Cl. 62—140)

This invention relates in general to refrigeration, and psychrometry; and particularly to a unique indirect air conditioning system.

Prior art, for cooling a substance or space have been made by the direct refrigeration system, i. e. a system in which a refrigerant is circulated to the substance or space; upon the conventional erroneous presumption that refrigerants such as carbon dioxide, and Freon are harmless to human beings.

Research, investigation, and study have shown that carbon dioxide is being used in slaughter houses for the euthanastic purpose of slaughtering hogs. Laboratory tests have shown that Freon, when contacted with an open flame; or smoke; has caused physical and mental phlegmatism; convulsions; and death to: mice, rabbits, dogs and hogs.

Consequently, an object of this invention is to cool an enclosure safely, where human beings congregate or assemble, such as in: theatres, arenas, troop halls, auditoriums, restaurants, hospitals, asylums, churches, etc., by means of an indirect air conditioning system, i. e., a cooling means in which a liquid, such as water or brine, cooled by a refrigerant, is circulated to the substance or space refrigerated, or is used to cool the air so circulated.

Another object of the present invention is to provide a new and useful improvement in utilization of liquidized moisture from the atmosphere, for cooling a refrigerant in a condenser.

Another object of the present invention is to provide a new and useful recovery technique and apparatus for the utilization of the psychro-dynamic-waste-air exhausting from a conditioned-enclosure, for the purpose of further cooling the refrigerant, i. e. a volatile chemical agent, such as for example: ether, ammonia, sulphur-dioxide, carbon dioxide, dichlorodifluoromethane, and dichloromethane.

A still further object of the present invention is to provide an improvement in ventilation; and to decrease the fire hazards in a building, having an indirect air conditioned enclosure.

A still further object of the present invention is to provide a unique process and apparatus for the reclamation and re-utilization of the excessive and overflowing liquidized moisture, i. e. synthetic water, from the psychro-aqua-factor, i. e. a cold-water-maker, and channelizing said synthetic water to the fire-fighting reserve tank, which is generally located in the basement or sub-basement in a building, and is for the exclusive purpose of supplying water to the standpipe tank and sprinkler tank. The water in these tanks or cisterns must be used only for extinguishing fires.

For a better visualization and comprehension of the hereinbefore indicated psychro-aqua-dynamic, and psychro-aero-dynamic objects reference is made to the accompanying drawing, the single figure of which is a schematic showing of an indirectly air conditioned inclosure in accordance with the invention. Further features and advantages will be in part self-explanatory, and in part pointed out, in a manner illustratively exemplified in the following description, when read in conjunction with the accompanying schematic drawing.

In air conditioning, an enclosure, for example, a theatre: it is desirable to maintain the temperature and the humidity within certain acceptable limits. During the summer months, the cooling and humidity loads vary considerably during the day, depending upon the ambient conditions and also upon the number of people within the conditioned space. For example, during the day the outside temperature tends to rise and the humidity tends to fall, while during the evening the outside temperature falls and the outside humidity rises. During week days a theatre may have very little attendance during the day, and it may be filled to capacity only for a few hours during the evening. However, on holidays and weekend days there may be a capacity crowd during the day which, of course, is apt to be during the period of high outside temperature, and the humidity may also be high.

With air conditioning systems for theatres, the cooling is obtained by an ejection, absorption or a mechanical refrigeration system, and the humidity is also controlled at the same time that the air is cooled. The conventional refrigeration system normally has a water-cooled condenser and it is becoming more and more necessary to economize in the recirculation and re-cooling of this condenser water. This water is re-cooled by passing it through a heat extractor, sometimes referred to as heat exchanger, or cooling tower, where it is sprayed through a stream of air so that some of the water evaporates, cooling the remainder.

This present invention is primarily concerned with an improvement in psychro-aqua-dynamic and psychro-aero-dynamic process for cooling the refrigerant in a condenser, and increasing the efficiency at a lower cost of operation.

In the indirect air conditioning system, represented in the drawing, part of the air from the enclosures 6, 36, 38, 40 and 42 is withdrawn through outlets 7 and channelized through a conduit 8 to the moisture liquidizer 9 wherein this recirculating air is cooled and de-moisted. Thus the emitted invisible water-vapor from the audience is liquidized or distilled. Positioned within the moisture liquidizing chamber is a cooling coil 10 in which cold brine or water circulates; which is an essential feature conducive to indirect refrigeration, to be described below.

The air to chamber 9 is formed by a stream of this return air from said conditioned enclosures; and a stream of outside air which is supplied through a conduit 11. The proportion of return air to outside air supplied to the moisture liquidizer is determined by the damper valve 4.

The proportion of outside supply air required, varies from about 25% to 75% with the minimum being set by local health regulations. This composite air flowing through chamber 9 is cooled so that it gives up a substantial amount of its moisture while the temperature of the evaporator and other conditions are so regulated that air of the desired temperature and humidity is channelized from the moisture liquidizing chamber 9, and through conduit 12, and through the diffusing inlets 13 and into the conditioned space. The liquidized moisture, i. e. synthetic water 14 from the stream of outside and return air is collected at the bottom of moisture liquidizer 9, in sump 16 from which it is channelized to the refrigerant condenser, as will be described below.

The entire refrigerant circuit in this arrangement is housed and circulated in the evaporator 17, compressor 18, condenser 20 located in the equipment room 22. The construction of walls, doors, floor, and ceiling of said equipment room 22, and the separate ventilating system therein is not claimed in this invention. The refrigerant in condenser 20 is cooled and condensed by the liquidized moisture, i. e, synthetic water 26, in sump 44 which is circulated through condenser 20 and returned to the spray or droplet header 28, under pressure by pump 30. The water 26 is in turn cooled in the heat-exchanger 24 hereinafter referred to as the psychro-aqua-factor, in which air is drawn through said psychro-aqua-factor 24 by a fan 32. A portion of this air passing through the psychro-aqua-factor 24, is outside supply air which enters through conduit 34; and the remainder is cool waste-air from the conditioned spaces 6, 38, 40, and 42, which is withdrawn through the outlets 36 and conduit 2. The proportion of air from the atmosphere, and the cool waste-air being controlled by louvre 3.

The refrigerant in evaporator 17 is expanded, i. e. transformed from a condensed or liquid state, into a vapor or gas state, thus the temperature of the refrigerant is lowered and thus the brine or water in coil 10 is in turn cooled which is circulated through the evaporator 17 and through the coil 10 under pressure by pump 15. The air striking against, or passing adjacent the brine or water coil 10, in the moisture liquidizer 9, and channelized through conduit 12, and through diffuser 13 into a public assembly enclosure 6, is completely devoid of any refrigerant if and when a leak or a rupture occurs anywhere in the refrigerant circuit.

"Waste air" is defined from an engineering and medical standpoint as the air from those portions of a theatre that must not be reconditioned for recirculation under the rules and regulations of the various departments of housing and buildings; and departments of health, i. e. tobacco-smoke-polluted air from the theatre 6, air from the rest rooms 38, lounges 40, employees' dressing room 42, and lavatories. This stream of polluted cooled-air passes through the psychro-aqua-factor 24 countercurrent or transversely to the water 26 which descends in spray or droplet form to a sump 44. As this water flows through the air, some of the water is evaporated cooling the remainder which is withdrawn from sump 44 to the refrigerant in condenser 20 and be re-circulated as described above. The use of the cool-waste air in the pshchro-aqua-factor 24 increases the efficiency of the air conditioning system by cooling of the spray, because the waste air has kinetic qualities, and a low relative humidity and it is at a lower temperature than the outside air. In a typical installation, representative values might be about 90° F. dry bulb and 80° F. wet bulb for the outside air with the inside air 80° F. dry bulb 70° F. wet bulb thus providing a 10° F. temperature differential that can be harnessed, channelized, and utilized to improve the efficiency according to my invention. In extreme circumstances the temperature differential may reach 25° F. This mixture of outside and cool-waste-air entering the psychro-aqua-factor is discharged to the outside atmosphere after flowing through the conduit 46.

The liquidized moisture 14, in sump 16 is channelized through the psychro-dynamic-water-conservator conduit 1, and into sump 44 at the bottom of the psychro-aqua-factor 24, and is channelized via pump 30, into condenser 20, where it removes heat from the refrigerant. The liquidized moisture 14 may either flow to sump 44 by gravity, or it may be pumped, as in the illustrative embodiment, depending upon the relative elevation of the sumps.

The temperature of the liquidized moisture 14 varies somewhere from between 33° F. to 56° F., generally averaging about 45° F., while water from the usual commercial sources such as reservoirs, lakes, rivers, wells, etc. averages considerably more than this during the summer months, i. e. 56° F. to 88° F. My invention causes the water in the sump 44 and the spray header 28 to be colder than it would be normally; thus less evaporation will be needed to liquify the refrigerant and consequently less make-up water will be required; because of the lower temperature and the decrease in the amount of water evaporated, a considerable increase in efficiency is obtained due to the use of this liquidized moisture in the psychro-aqua-factor 24. Not only is there an overall increase in efficiency in this system, but I obtain a system that requires little or no additional water once the system is in operation which is a most important factor in areas where the water supply or the sewer system is restricted.

During the hot and humid summer days, an extraordinary amount of invisible moisture is naturally emitted from human beings, via the respiratory system; and the perspiratory system. This natural emission of moisture is added to the natural moisture in the atmosphere, extracted and liquidized in the moisture liquidizer 9, as described above and illustrated in the drawing.

According to my invention, this excessive combination of moistures, after liquidization or distillation, overflows from sump 44 into outlet 49, and is channelized through conduit 50 into the fire-fighting reserve tank (not shown); located generally in the basement or sub-basement of a building.

While I have shown and described an illustrative embodiment adapted to a theatre, I wish it understood this is not intended to be exhaustive or limiting but on the contrary is given to more fully explain the principles involved that those skilled in the art may better apply the invention to the particular circumstances involved, including the conditioning of space for inanimate as well as animate objects.

I therefore particularly point out and distinctly claim as my invention:

1. An indirect air conditioning system for an enclosure of a public building where persons congregate comprising a refrigeration system of the compressor, condenser, evaporator type; a cooling, demoisting, and moisture-liquidizing chamber spaced from the evaporator and cooled indirectly therefrom and having a liquidate receiving sump; a duct for conducting conditioned air from the chamber to the enclosure; an evaporative psychro-aqua-factor removed from the condenser; means for conducting the liquidate from the sump to the psychro-aqua-factor; means for conducting water from the psychro-aqua-factor to the condenser and back to the psychro-aqua-factor; a fire-fighting reserve tank and means for conducting excess water from the psychro-aqua-factor to said fire-fighting reserve tank.

2. An air conditioning system as described in claim 1, and including means for exhausting air from the enclosure and supplying it to the psychro-aqua-factor.

References Cited in the file of this patent

UNITED STATES PATENTS

| Number | Name | Date |
|---|---|---|
| 1,408,453 | Goosman | Mar. 7, 1922 |
| 1,977,315 | Lewis | Oct. 16, 1934 |
| 1,983,023 | Fleisher | Dec. 4, 1934 |
| 2,004,927 | Bulkeley | June 18, 1935 |
| 2,018,453 | Lawler | Oct. 22, 1935 |
| 2,120,883 | Brace | June 14, 1938 |
| 2,167,878 | Crawford | Aug. 1, 1939 |
| 2,212,356 | Shure | Aug. 20, 1940 |
| 2,232,459 | Hull | Feb. 18, 1941 |
| 2,297,928 | Wilson | Oct. 6, 1942 |